United States Patent [19] [11] 4,327,194
Chandalia et al. [45] Apr. 27, 1982

[54] FLEXIBLE POLYURETHANE FOAM PREPARED FROM A REACTION MIXTURE WHICH INCLUDES A POLYETHER TRIOL CONTAINING AN EFFECTIVELY DISPERSED FINELY DIVIDED SOLID PARTICULATE MATERIAL

[75] Inventors: Kiran B. Chandalia, Cheshire; Henry G. Barnowski, Durham, both of Conn.

[73] Assignee: Olin Corporation, New Haven, Conn.

[21] Appl. No.: 230,767

[22] Filed: Feb. 2, 1981

Related U.S. Application Data

[63] Continuation-in-part of Ser. No. 6,951, Jan. 25, 1979, Pat. No. 4,278,770, which is a continuation-in-part of Ser. No. 898,274, Apr. 20, 1978, abandoned, which is a continuation-in-part of Ser. No. 881,297, Feb. 27, 1978, abandoned.

[51] Int. Cl.³ .............................................. C08G 18/14
[52] U.S. Cl. ...................................... 521/99; 521/106; 521/117; 521/122; 521/123; 521/124; 521/128; 521/137; 521/174
[58] Field of Search ................. 521/99, 106, 117, 122, 521/123, 124, 128, 137, 174

[56] References Cited

U.S. PATENT DOCUMENTS

| | | | |
|---|---|---|---|
| 3,004,921 | 10/1961 | Stossel | 260/2.5 AK |
| 3,021,290 | 2/1962 | Gmitter et al. | 260/2.5 AK |
| 3,024,209 | 3/1962 | Ferrigno | 260/2.5 AK |
| 3,150,109 | 9/1964 | Ferrigno | 260/2.5 AK |
| 3,298,976 | 1/1967 | Reinhart | 260/2.5 AK |
| 3,383,351 | 5/1968 | Stamberger | 260/33.2 |
| 3,396,126 | 8/1968 | Gurley, Jr. et al. | 260/2.5 AK |
| 3,441,523 | 4/1969 | Dwyer et al. | 260/2.5 AK |
| 3,467,606 | 9/1969 | Rice | 260/2.5 AH |
| 3,598,772 | 8/1971 | Hood et al. | 260/2.5 |
| 3,600,340 | 8/1971 | Patton, Jr. et al. | 260/2.5 AK |
| 3,640,920 | 2/1972 | Cear | 260/2.5 AK |
| 3,652,639 | 3/1972 | Pizzini et al. | 260/465.4 |
| 3,716,502 | 2/1973 | Loew | 260/2.5 AK |
| 3,772,222 | 11/1973 | Steward et al. | 260/2.5 AM |
| 3,772,224 | 11/1973 | Marlin et al. | 260/2.5 AM |
| 3,775,350 | 11/1973 | Juhas | 260/2.5 AK |
| 3,823,096 | 7/1974 | Fabris et al. | 260/2.5 AM |
| 3,823,201 | 7/1974 | Pizzini et al. | 260/861 |
| 3,880,780 | 4/1975 | Ridenour et al. | 260/2.5 AM |
| 3,909,464 | 9/1975 | Anorga et al. | 260/2.5 AK |
| 3,925,266 | 12/1975 | Fabris et al. | 260/2.5 AM |
| 3,926,867 | 12/1975 | Quock et al. | 260/2.5 AK |
| 3,931,062 | 1/1976 | Cobbledick | 260/2.5 AK |
| 3,931,066 | 1/1976 | Puig et al. | 260/2.5 AS |
| 3,933,701 | 1/1976 | Puig et al. | 260/2.5 AT |
| 4,005,035 | 1/1977 | Deaver | 260/2.5 AK |
| 4,022,941 | 5/1977 | Prokai et al. | 260/2.5 AH |
| 4,029,593 | 6/1977 | Schäpel et al. | 252/182 |
| 4,062,825 | 12/1977 | Watabe et al. | 260/37 N |
| 4,108,791 | 8/1978 | Wasilczyk | 252/182 |

OTHER PUBLICATIONS

Standard Method of Test for Fineness of Dispersion of Pigment Vehicle Systems, ASTM Designation: D 1210-64, pp. 228-233 (1964).

Primary Examiner—Maurice J. Welsh
Attorney, Agent, or Firm—William D. Sabo

[57] ABSTRACT

A select polyether polyol is used in preparing flexible polyurethane foam having desirable physical properties. The select polyether polyol is an oxypropylated, oxyethylated triol containing an effectively dispersed finely divided solid particulate material. The resulting foam is of utility in various applications, such as cushioning.

23 Claims, No Drawings

FLEXIBLE POLYURETHANE FOAM PREPARED FROM A REACTION MIXTURE WHICH INCLUDES A POLYETHER TRIOL CONTAINING AN EFFECTIVELY DISPERSED FINELY DIVIDED SOLID PARTICULATE MATERIAL

This application is a continuation-in-part of copending application Ser. No. 006,951, filed Jan. 25, 1979, now U.S. Pat. No. 4,278,770, issued July 14, 1981, which in turn is a continuation-in-part of application Ser. No. 898,274, filed Apr. 20, 1978, now abandoned, which in turn is a continuation-in-part of application Ser. No. 881,297, filed Feb. 27, 1978, now abandoned.

This invention relates to the preparation of polyurethane foam; and, more particularly, to an improvement in the preparation of flexible polyether polyurethane foam.

It is known to prepare flexible polyurethane foams by the reaction of a polyether polyol with an organic polyisocyanate. A variety of polyether polyols have been recognized in the art as being of utility in this type of a reaction. These include the condensation products of a polyhydric alcohol and one or more alkylene oxides. See for example U.S. Pat. Nos. 3,461,086; 3,535,307; 3,336,242 and 3,738,953. The reaction of such polyether polyols with an organic polyisocyanate is generally carried out in the presence of various reaction catalysts and foaming agents. Optionally additional ingredients, such as a surfactant and/or a curing agent, may be incorporated in the reaction mixture in order to impart certain properties to the foam.

It is also known that oxypropylated, oxyethylated triols are highly reactive when employed as the polyol reactant in making flexible polyurethane foam. Such triols are not ordinarily utilized, however, in flexible foam-forming reaction mixtures; their high reactivity makes control of the reaction difficult; and the flexible foams obtained from reaction mixtures which contain these triols are often unacceptable.

A standard measure of processing acceptability is the "tin range", defined generally as the range over which the amount of tin catalyst in a foaming formulation can be varied and still yield foams with acceptable properties. The tin range for a foaming formulation is determined by utilizing in the formulation a tin catalyst, such as stannous octoate, to force the reaction between polyether polyol and polyisocyanate at such a rate that viscosity is rapidly increased and the blowing gas is trapped and held. Too much of an increase in viscosity growth results in a closed cell foam with relatively thick strong cell membranes, and which exhibits a very low air flow and accompanying pre-cure shrinkage. Too little of a rate of viscosity growth causes extensive thinning of the cell membranes, cell rupture, loss of blowing gas and resulting foam collapse, settling or splitting. To permit practical utility, the tin range must be sufficiently broad so as to avoid frequent foam product failure due to routine minor fluctuations which inevitably occur in the pumped flow rate of the tin catalyst feed stream to the reaction mixture.

Because of the relatively high reactivity of oxypropylated, oxyethylated triols, it would be desirable to employ them in preparing flexible polyurethane foams. It has been found, however, that flexible foam-forming reaction mixtures which contain these triols have unacceptable tin ranges. The tin ranges are generally too narrow, and an unsatisfactorily high percentage of unacceptable foams is obtained.

Thus, there is a need in the art for a process for preparing satisfactory flexible polyurethane foams from reaction mixtures comprised of oxypropylated, oxyethylated triols and which feature improved processing acceptability.

Accordingly, it is an object of the present invention to provide an improved process for preparing flexible polyurethane foams.

It is a further object of the present invention to provide a process for preparing flexible polyurethane foams from a reaction mixture which includes an oxypropylated, oxyethylated triol and achieves improved processing acceptability.

Now, it has been discovered, according to the invention, that an improvement can be achieved in preparing flexible polyurethane foams by incorporating in the foam-forming reaction mixture a proportion of a select oxypropylated, oxyethylated triol. Reaction mixtures containing the select oxypropylated, oxyethylated triols as defined hereinbelow display a significantly enhanced tin range, and they produce foams possessing a combination of physical properties which make them eminently suitable for a wide variety of cushioning applications.

More in detail, in the process of the invention, there is employed a polyether triol having a molecular weight of about 1,000 to about 6,500 and at least 10 percent of primary hydroxyl groups and which is the product of sequentially oxyalkylating a trihydroxy alcohol first with propylene oxide or a mixture thereof with ethylene oxide and then with ethylene oxide, the triol containing a proportion of an effectively dispersed finely divided solid particulate material, the particulate material having, prior to dispersion in the triol, an average primary particle size of about 0.007 to about 10 microns and a pH ranging from about 3 to about 5, and further having, in dispersion in the triol, an effective maximum particle size of less than about 100 microns. The polyurethane foams which are produced are flexible polyurethane foams exhibiting "SAC factors" of about 1.7 to about 2.2. In polyurethane foam technology, the industry generally considers "SAC factor" to be the characteristic which differentiates conventional, flexible foams from so-called "high resilience" foams. This SAC factor is a measure of support provided by a cushioning material, and it represents the ratio of indentation load deflection, ILD, at 65 percent deflection to that at 25 percent deflection (as per ASTM D-1564-64T). According to SPI standards, conventional, flexible foams exhibit a SAC factor of about 1.7 to about 2.2, while high resilience foams display a factor of above about 2.2 to about 3.2.

In the preparation of the flexible polyurethane foams of the invention, either the so-called "one-shot method" or the "semi-prepolymer technique" may be employed, the one-shot method being generally preferred. The flexible polyurethane foam is prepared from a reaction mixture comprised of a polyether triol, as described hereinbelow, an organic polyisocyanate, a foaming agent and a reaction catalyst.

The polyether triol can be prepared by methods generally well known in the art wherein a trifunctional alcohol initiator is sequentially condensed, in the presence of an oxyalkylation catalyst, first with propylene oxide or a mixture thereof with ethylene oxide and then with ethylene oxide. The alcohol initiator used in preparing the polyether triol can be any compound having three hydroxyl terminal groups. However, the aliphatic triols are preferred, particularly those containing 3-12 carbons. Illustrative are glycerol, trimethylolpropane, triethylolpropane, 1,3,5-hexanetriol, 1,2,6-hexanetriol, 1,4,6-octanetriol, and 1,5,10-dodecanetriol. The most preferred embodiments of the invention employ aliphatic triols having 3-6 carbon atoms, such as glycerol and trimethylolpropane.

Conventional oxyalkylation catalysts are used in preparing the polyether triol. In order to achieve the requisite molecular weight in the polyether triol, a basic catalyst, such as potassium hydroxide or sodium hydroxide, is ordinarily required.

While as indicated above, the polyether triol may have a molecular weight of about 1,000 to about 6,000, it is preferred to use in preparing the polyurethane foams of the invention those polyether triols which have a molecular weight of about 2,500 to about 3,500. It is also preferred that the polyether triol contain about 25 to about 75 percent of primary hydroxyl groups.

As aforementioned, the polyether triol contains a small proportion of effectively dispersed fine particulate material. The degree of dispersion of the particulate material in the polyether triol is a critical factor in the practice of the process of the invention. Upon being blended into the triol, the fine particulate material undergoes agglomeration, forming clusters of particles markedly larger than the individual particles themselves; such particle agglomerates can exhibit effective sizes more than 100 times greater than the initial size of the individual particles. Polyurethane foam reaction formulations containing fine particulate material which has not been selectively blended to ensure a reduced effective dispersed particle size within the critical limits, as presently defined, fail to demonstrate acceptable processing lattitude in producing satisfactory flexible foams.

Practicing the method of the present invention, suitable fine particulate material is dispersed in the triol to form a dispersion in which the fineness or effective maximum size of the particles, or particle agglomerates, in the dispersion is less than about 100 microns (e.g., per ASTM D-1210-64). Such a dispersion can be accomplished by using higher shear mixers or other blending equipment which effectively eliminates agglomerates or reduces the particle agglomerate size to form a triol composition featuring dispersed particle characteristics within the specified critical range. Preferably, the effective particle size in dispersion is less than about 50 microns.

The particulate materials that are utilized according to the present invented method are select, finely divided, solid particles that are compatible with, but insoluble in, the foam reaction mixture. Preferably, the particles have an average primary particle size of less than about 75 microns, a surface area of at least about 30 m$^2$/g, and exhibit a bulk density of from about 1 to about 65 lbs./ft.$^3$. Naturally occurring materials meeting such physical criteria are not commonly available, but suitable particulate material can be synthetically prepared by known methods. Illustrative of particulate materials that can be used are: non-metal oxides based on non-metals such as silicon and phosphorus, for example, silicon dioxide, phosphates and phosphites; metal oxides, metal silicates and metal salts, based on metals such as magnesium, calcium, titanium, barium, aluminum, iron, copper, and zinc; solid organic polymers, such as polystyrene, polyacrylonitrile, polyvinylalcohols, polyvinylchloride and copolymers thereof; solid inorganic polymers, such as polymeric metal alkoxides including polyorganosiloxanometalloxanes (e.g., polytriethylsiloxanoaluminoxane, and polytrimethylsiloxanotitanoxane), and silicones; graphite; carbon; and organic pigments, such as common paint pigments, including phthalocyanines. Particulate carbon (e.g., channel black) and inert metal and non-metal oxide particles, such as can be produced by hydrolysis of metal and non-metal chlorides in an oxygen-hydrogen flame (e.g., U.S. Pat. Nos. 3,083,115, 3,086,851 and 3,103,495), are preferred. Particularly preferred are silicon dioxides (e.g., synthetic amorphous silica, hydrophilic or modified hydrophobic), titanium dioxides and aluminum oxides, such as are commercially available under the trademark "AEROSIL" from Degussa Corporation, under the trademark "CAB-O-SIL" from Cabot Corporation and under the trademark "SYLOID" from W. R. Grace Co. Such inert oxides featuring an average primary particle size of about 0.007 to about 10 microns, having a surface area of about 50 to about 400 m$^2$/g, having a pH ranging from about 3 to about 5, and with a bulk density of from about 1 to about 10 lbs./ft.$^3$ are most preferred.

According to the present invention, at any step in the preparation of the foam ingredients, a small proportion of select fine particulate materials is blended into the polyol reactant composition in a manner to effectively disperse the particles as described hereinabove. While this particulate agent may be added in any suitable amount for a particular formulation, it has been found preferable to employ the agent in an amount ranging from about 0.1 to about 5.0 percent, based on the weight of the polyether polyol. Most preferably, about 0.25 to about 1.0 percent of the particulate agent is used.

In preparing the foams of the invention, any suitable organic polyisocyanate, or a mixture of polyisocyanates, may be employed in the reaction mixture. Illustrative are toluene diisocyanate, such as the 80:20 and the 65:35 mixture of the 2,4- and 2,6-isomers, ethylene diisocyanate, propylene diisocyanate, methylene-bis(4-phenyl)isocyanate, 3,3'-ditoluene-4,4'-diisocyanate, hexamethylene diisocyanate, naphthalene-1,5-diisocyanate, polymethylene polyphenyl isocyanate, mixtures thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20.

The total amount of polyisocyanates that is employed should generally be sufficient to provide at least 0.7 NCO group per hydroxyl group in the reaction system, which includes the polyether polyol, as well as any additional material and/or foaming agent present in the system. However, in practice, such a proportion of polyisocyanate is usually employed as to provide no more than about 1.25, and preferably about 0.9-1.15, NCO groups per each hydroxyl group.

Any suitable foaming agent, or mixture of foaming agents, may be employed in preparing the polyurethane foam. These include inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Generally, however, the halogenated alkanes, for example, are employed in an amount of about 2-20 parts per 100 parts by weight of the polyether polyol; and water is employed in an amount of about 1-6 parts per 100 parts by weight of the polyether polyol.

The catalyst employed in preparing the foams of the invention may be any of the catalysts known to be useful for this purpose, including tertiary amines, mixtures thereof, organo-metallic salts, and mixtures of an organo-metallic salt with one or more tertiary amine, the latter being preferred. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV" and Dabco 8020", respectively, and bis(dimethylaminopropylether). The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.05-1.5, and preferably about 0.1-0.75, parts per 100 parts by weight of the polyether polyol which is employed in preparing the foam.

Typical organo-metallic salts include, for example, the salts of tin, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodeconates of these metals, the octoates being preferred. The organo-metallic salt catalyst is used in a proportion of about 0-0.5, and preferably about 0.05-0.2, parts per 100 parts by weight of the polyether polyol which is employed in the preparation of the foam.

It is preferred in the preparation of the polyurethane foams of the invention to employ minor amounts of a conventional surfactant in order to further improve the cell structure of the polyurethane foam. Suitable such surfactants include, for example, the silicon-based surfactants such as the silicones and the siloxaneoxyalkylene block copolymers, all of which are commercially available materials. Generally, the silicones are employed in a proportion of up to about 0.1 part per 100 parts by weight of the polyether polyol; and the siloxaneoxyalkylene block copolymers are employed in a proportion of up to about 2 parts per 100 parts by weight of the polyether polyol.

If desired, a curing agent, such as a conventional amine curing agent, may be included in the foam-forming reaction mixture. However, pursuant to the present invention, the use of curing agents is not necessary, and therefore it is preferable to exclude such materials from the reaction mixture.

Various additives can also be employed to provide different properties in the polyurethane foam, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants, antioxidants and flame retardants may be added.

Foams prepared in accordance with the principles of the present invention are characterized by favorable processing characteristics and physical properties. The foams are substantially open-celled and become tack-free within a relatively short period of time after foaming cessation. Generally ranging in density from about 0.8 to about 5.0, preferably from about 1.0 to about 2.5, pounds per cubic foot, the cured foams feature a SAC factor generally ranging from about 1.7 to about 2.2. The foams of the invention are also characterized by good tear strength, tensile strength, and elongation properties. By virtue of the combination of desirable physical properties characterizing the polyurethane foams of the invention, these foams are of utility in numerous cushioning applications.

The following examples are provided to illustrate the invention. In these examples, all parts and percentages are by weight unless otherwise specified.

EXAMPLE 1

Preparation of Polyol Containing Particulate Dispersion

681 Grams of synthetic fumed silica were added to 300 pounds of a polyether polyol and mixed for about 60 minutes using a high shear mixer. The silica, obtained commercially under the trademark Cab-O-Sil Grade M-5 from Cabot Corporation, is reported to have a pH of 3.5-4.2 and a primary particle size of 14 millimicrons. The polyether polyol had a molecular weight of about 3,000 and was prepared by end-capping a propoxylated glycerin precursor with 7.5 moles of ethylene oxide to a final hydroxyl number of about 56.0. The effective maximum size of the particles and/or particle agglomerates in dispersion was measured, using a grind gauge, per ASTM D-1210-64, to be about 50 microns.

COMPARATIVE EXAMPLE A

To demonstrate the criticality of the degree of dispersion, a second polyol was prepared, using the same components and proportions as in Example 1, except that in this comparative preparation, the polyol was prepared without the addition of any silica.

EXAMPLES 2-5 AND COMPARATIVE EXAMPLES B AND C

A series of examples was performed to demonstrate the effect of dispersed particle size on foam processing and stabilization as represented by tin range evaluations.

In Examples 2–5, the polyol dispersion of Example 1 containing 0.5 parts of silica was used in preparing flexible foams; and in Comparative Examples B and C, the polyol of Comparative Example A, was employed in making flexible foams. In all the examples, the foams were prepared, according to the formulations reported below in Table I, using a foam machine (manufactured by Martin Sweet, Louisville, Ky.) having a throughput of 150 pounds per minute. The amounts of stannous octoate were varied to determine the tin ranges for the formulations employing the polyols from Example 1 and Comparative Example A. The results reported in Tables II and III illustrate that effective dispersion of solid particulate matter in the triol is a critical factor in achieving satisfactory foam processing. The narrow tin range evidenced by the use of a polyol which did not contain any silica is impractical and unsatisfactory.

TABLE I

|  | Examples | | | | Comparative Examples | |
| --- | --- | --- | --- | --- | --- | --- |
|  | 2 | 3 | 4 | 5 | B | C |
| Polyol[1] | 99.5 | 99.5 | 99.5 | 99.5 | 100 | 100 |
| Dispersed Silica | 0.5 | 0.5 | 0.5 | 0.5 | — | — |
| Water | 4.5 | 4.5 | 4.5 | 4.5 | 4.5 | 4.5 |
| Amine Catalyst[2] | 0.2 | 0.2 | 0.2 | 0.2 | 0.2 | 0.2 |
| Surfactant[3] | 1.1 | 1.1 | 1.1 | 1.1 | 1.1 | 1.1 |
| Methylene Chloride | 4 | 4 | 4 | 4 | 4 | 4 |
| Tetrakis (2-Chloroethyl) Ethylene Diphosphate[4] | 10 | 10 | 10 | 10 | 10 | 10 |
| Toluene Diisocyanate[5] Index | 120 | 120 | 120 | 120 | 120 | 120 |
| Stannous Octoate | 0.6 | 0.65 | 0.7 | 0.9 | 0.4 | 0.5 |

[1]This is a polyether triol having 55 percent primary hydroxyl groups and an approximate molecular weight of about 3,000. It was prepared by sequentially oxyalkylating glycerin first with 46 moles of propylene oxide and then with 7.5 moles of ethylene oxide.
[2]This is a commercially obtained product sold under the trademark "Polycat 77-50".
[3]This is a siloxaneoxyalkylene block copolymer sold under the designation "L-5740".
[4]This is a flame retardant additive sold under the trademark "Thermolin 101".
[5]This is a mixture of toluene diisocyanate isomers (80:20 mixture of 2,4/2,6-isomers).

TABLE II

TIN RANGE STUDIES

| Example or Comparative Example | Stannous Octoate Concentration | Observations |
| --- | --- | --- |
| 2 | 0.6 | Slight split in the foam. |
| 3 | 0.65 | Health bubbles, good foam. |
| 4 | 0.7 | Health bubbles, good foam. |
| 5 | 0.9 | Some health bubbles, but foam fairly tight; appears to be maximum acceptable tin level. |
| B | 0.4 | Split in the foam. |
| C | 0.5 | Some health bubbles, but foam fairly tight; appears to be maximum acceptable tin level. |

TABLE III

PHYSICAL PROPERTIES

|  | Example 3 | Comparative Example C |
| --- | --- | --- |
| Density, pcf | 1.25 | 1.25 |
| Identation Load Deflection |  |  |
| @ 25% Deflection | 33 | 37 |
| @ 65% Deflection | 66 | 77 |
| SAC Factor | 2.01 | 2.07 |
| Tensile, psi | 11.3 | 11.5 |
| Tear, pli | 1.7 | 1.3 |
| Elongation, % | 177 | 127 |
| Air Flow, cfm | 2.21 | 1.01 |
| Ball Rebound, % | 31 | 29.6 |
| Foam Processing | Good, Open Foam | Air Flow Significantly Lower |

What is claimed is:

1. In a process for preparing a flexible polyurethane foam from a reaction mixture comprised of a polyether polyol, an organic polyisocyanate, a foaming agent and a reaction catalyst, said foam exhibiting a SAC factor of about 1.7 to about 2.2, the improvement wherein:
    said polyether polyol is a triol having a molecular weight of about 1,000 to about 6,500 and at least 10 percent of primary hydroxyl groups and which is the product of sequentially oxyalkylating a trihydroxy alcohol first with propylene oxide or a mixture thereof with ethylene oxide and then with ethylene oxide, said triol containing a proportion of an effectively dispersed finely divided solid particulate material, said particulate material having, prior to dispersion in said triol, an average primary particle size of about 0.007 to about 10 microns and a pH ranging from about 3 to about 5, and further having, in dispersion in said triol, an effective maximum particle size of less than about 100 microns.

2. The process of claim 1 wherein said polyether triol contains about 25 to about 75 percent of primary hydroxyl groups.

3. The process of claim 2 wherein said polyether triol has a molecular weight from about 2,500 to about 3,500.

4. The process of claim 3 wherein said trifunctional alcohol is glycerin or trimethylolpropane.

5. The process of claim 4 wherein said particulate material is dispersed to an effective maximum particle size in dispersion of less than about 50 microns.

6. The process of claim 5 wherein said particulate material is added in an amount ranging from about 0.1 to about 5.0 percent, by weight, based on the weight of the polyether polyol.

7. The process of claim 6 wherein said amount ranges from about 0.25 to about 1.0 percent.

8. The process of claim 6 wherein said finely divided solid particulate material is selected from the group consisting of non-metal oxides, metal oxides, metal silicates, metal salts, solid organic polymers, solid inorganic polymers, carbon, organic pigments, and mixtures thereof.

9. The process of claim 8 wherein said particulate material is selected from the group consisting of synthetic silicon dioxide, titanium dioxide, aluminum oxide, and mixtures thereof.

10. The process of claim 9 wherein said particulate material is a synthetic amorphous silica.

11. The process of claim 10 wherein said particulate material is a synthetic hydrophobic amorphous silica.

12. The process of claim 8 wherein prior to dispersion into said triol, said particulate material has a surface area of about 50 to about 400 m²/g and a bulk density of about 1 to about 10 lbs./ft.³.

13. The process of claim 8 wherein said catalyst comprises a tertiary amine.

14. The process of claim 13 wherein said reaction mixture comprises a polyurethane foam surfactant.

15. The process of claim 14 wherein said foaming agent is water.

16. The process of claim 15 wherein said organic polyisocyanate is toluene diisocyanate.

17. The process of claim 16 wherein said polyether triol is an oxypropylated, oxyethylated glycerin.

18. The process of claim 17 wherein said trifunctional alcohol is glycerin and said polyether triol contains about 55 percent of primary hydroxyl groups and has a molecular weight of about 3,000.

19. A flexible polyurethane foam prepared according to the process of claim 1.

20. A flexible polyurethane foam prepared according to the process of claim 7.

21. A flexible polyurethane foam prepared according to the process of claim 12.

22. A flexible polyurethane foam prepared according to the process of claim 17.

23. A flexible polyurethane foam prepared according to the process of claim 18.

* * * * *